June 16, 1964 — W. H. NORTON — 3,137,785
ELECTRIC BASEBOARD HEATER
Filed Nov. 13, 1959 — 2 Sheets-Sheet 1

Inventor
William H. Norton

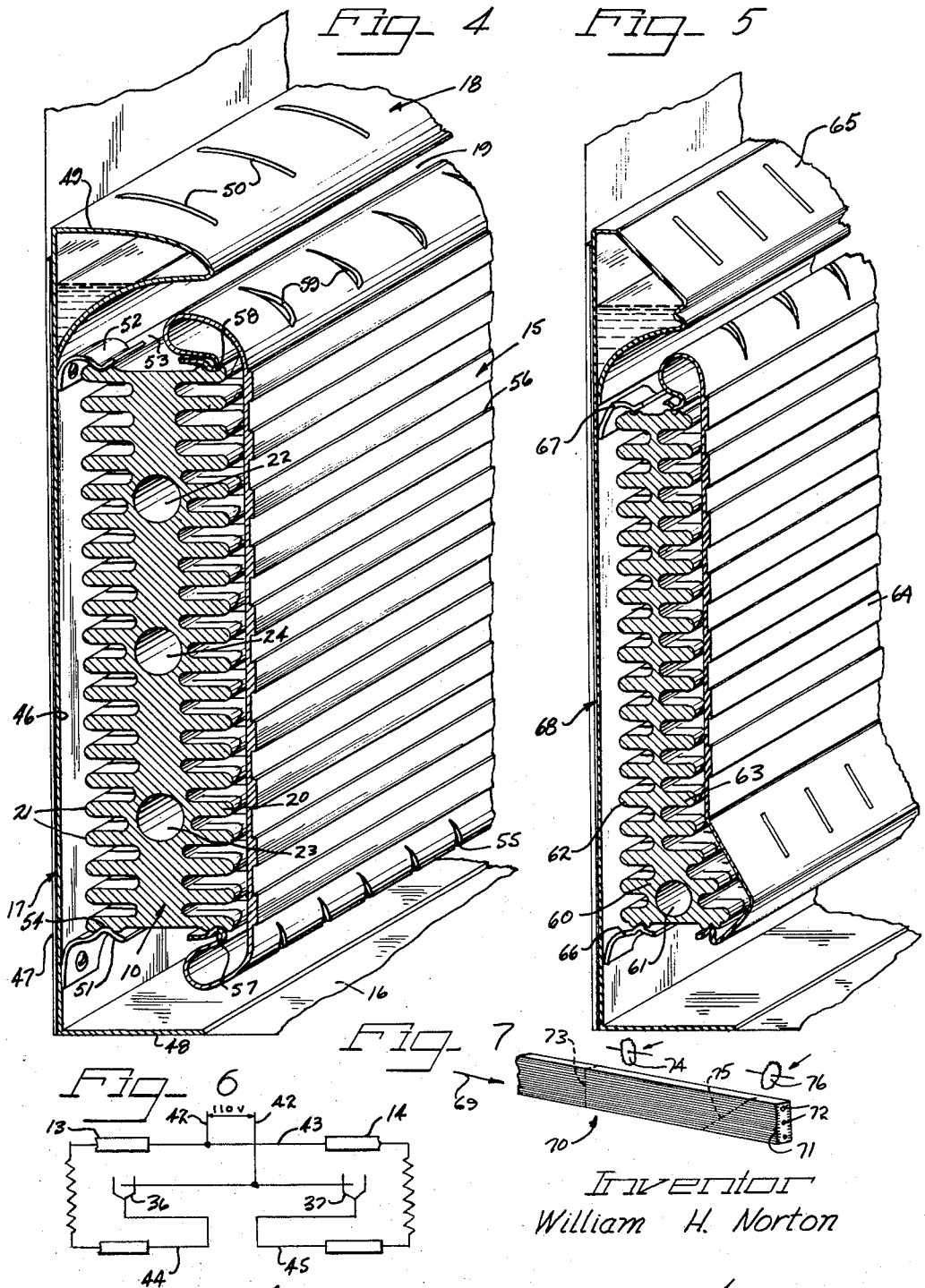

United States Patent Office 3,137,785
Patented June 16, 1964

3,137,785
ELECTRIC BASEBOARD HEATER
William H. Norton, Mundelein, Ill., assignor to Thermel Incorporated, Franklin Park, Ill., a corporation of Delaware
Filed Nov. 13, 1959, Ser. No. 852,813
2 Claims. (Cl. 219—345)

The present invention relates to an improved method of making and structure for an electric baseboard heating unit.

The present invention contemplates the provision of an improved baseboard heater unit which is mounted to heat a room area and is usually mounted on the outside wall of a home or a commercial building. The baseboard heater may furnish auxiliary heat to supplement a main heating system but preferably is used as the sole source of heat. The heating unit heats by radiation and convection and is energized electrically. Electric heating such as through baseboard units is desirable in eliminating the need for furnaces and for duct work or piping required with other heat units, has a high economy of installation, is clean and is controllable to a high degree of uniformity and accuracy.

An object of the present invention is to provide an improved method and structure for an electrically energized baseboard heating unit which is efficient and effective in heating and which is particularly simple and inexpensive to manufacture.

Another object of the invention is to provide an improved electrical baseboard heating unit which is attractive in its appearance, is effective in circulating heat into the room, and requires a minimum of space for installation.

Another object of the invention is to provide an improved electrical baseboard heating unit which has a low watts per unit of area density, and a low gradient, and employs fins of a high conductivity material to avail high protection factors against excessive and dangerous temperatures avoiding fire hazard in case of accidental covering, or injury to individuals coming in contact with the unit.

Another object of the invention is to provide an improved electrical heating unit which provides easy installation of either straight or hairpin shaped tubular heating elements and gives a variation and a wide latitude of installation arrangements.

Other objects and advantages will become more apparent with the teaching of the principles of the invention in connection with the disclosure of the preferred embodiments thereof in the specification, claims and drawings, in which:

FIGURE 4 is a detailed perspective view showing a section taken through a heating unit;

FIGURE 5 is a perspective view showing a section taken through another form of heating unit;

FIGURE 6 is a diagrammatic wiring plan for the heating unit; and,

FIGURE 7 is a schematic illustration of the method of making the body of the heating unit.

As shown on the drawings:

Figure 1:
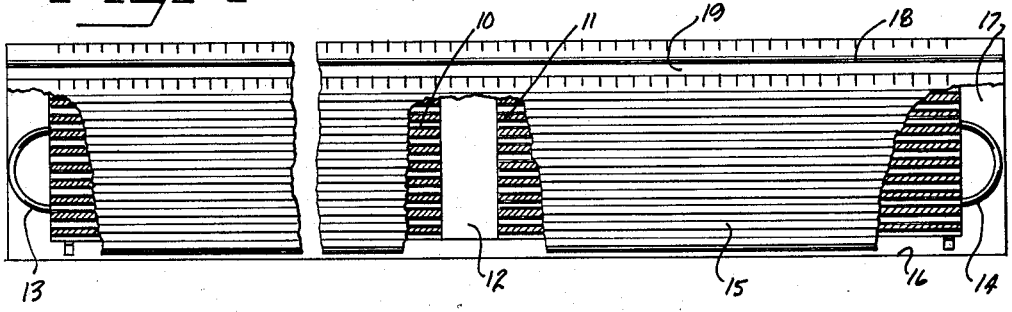
FIGURE 1 is an elevational view of a baseboard heater installation with parts broken away for description.

FIGURE 1 illustrates a heating installation in a room wherein first and second heating unit body sections 10 and 11 are arranged in end to end relationship in a single installation. The body sections 10 and 11 are separated and have a connector box 12 between them for receiving electrical supply conduit or cable. Within the body sections 10 and 11 are tubular heating elements 13 and 14. The unit is of the baseboard type and mounted against a wall adjacent a floor 16 and the body sections 10 and 11 are protected by a front cover plate 15 which is spaced slightly outwardly from the body sections to afford circulation of air and which is spaced above the floor 16 so that cold air may enter beneath the lower edge of the front cover plate 15 and flow up over the body sections. The unit is supported on a back plate 17 which also supports a humidifier chamber 18. The air which circulates over the body sections leaves through a slot 19 at the top edge of the front cover plate.

As illustrated in FIGURE 4, the body sections such as 10 are formed of extruded aluminum. Projecting outwardly from the body are a plurality of longitudinally extending horizontal fins 20 and 21 at each side of the body. Within the body are first and second extruded elongated openings or passages 22 and 23 for receiving and containing tubular heating elements. Between the openings 22 and 23 is a third extruded opening 24 for receiving a thermal sensitive control element.

Figure 2:
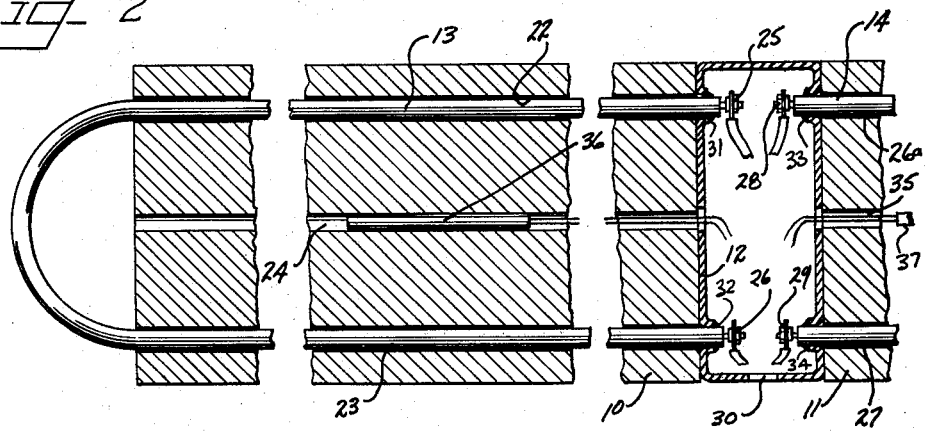
FIGURE 2 is a vertical sectional view taken through the installation of FIGURE 1.

As illustrated in FIGURE 2, the tubular heating elements 13 and 14 are of the commercially known type having an outer tube with an electrical resistance element therein embedded in compacted insulating material. The resistance wire may be helical in shape (and made of Nichrome or a similar heating element wire) and the sleeve being formed of a thermally conductive material such as stainless steel. The electrical insulative material is of a refractory particulate type such as magnesia which fills the sleeve and maintains the resistance wire in position therein.

The tubular heating element is press fit into the elongated openings 22 and 23 and preferably staked in place. Heating element 13 is bent to a U-shape so that the electrical terminal ends 25 and 26 project in the connector box 12. The tubular heater element 14 is similarly bent into a U-shape and press fit into elongated openings 26a and 27 in the body section 11 with electrical terminals 28 and 29 projecting into the connector box. The connector box is preferably of the watertight type with an opening 30 for entrance of a supply conduit or cable which will be sealed. The tubular elements enter the connector box 12 at side openings provided therein and can be sealed in a moistureproof manner such as by induction welding at 31 and 32 for the heater element 13 and at 33 and 34 for the heater element 26. Thus all electrical connections are protected and since the tubular heating elements 13 and 14 are of the waterproof type the unit can be safely used in a location where it might come in contact with water such as in a dairy or in locations where the floor is to be scrubbed or swabbed. This structure with the sealed connector box and its connection to the heater elements and the closed tubular heating element provides an explosion-proof installation which obtains advantages over installations now used, such as in environments where explosive gases may be present, where explosive concentrations of dust may occur or where explosives are to be made or handled.

In the central elongated openings 24 for the body section 10 and 35 for the body section 11, are located thermal sensitive units 36 and 37. These units are chosen to open the supply circuit to the heating elements at a maximum temperature. In cases where a room thermostat is used, it is possible for the room temperature to be cool with a continued supply of electricity to the heating elements such as when the heating unit is accidentally covered. Overheating with danger of conflagration or danger of burning individuals is prevented by the thermal sensitive units which measure the temperature of the body sections and break the electrical circuit at a maximum temperature. Since the thermal sensitive unit is located in the body sections, and in the arrangement shown is directly between the heating elements, accurate and reliable control is obtained.

It will be understood that while the body section arrangement permits using two body sections with U-shaped or hairpin tubular elements, the arrangement is also well adapted to using a single body section or different numbers of body sections with straight lengths of heating elements extending therethrough. It will be noted that the same body sections may be employed for arrangements employing different numbers so that the manufacturer can make only one type of body section and supply demands for units containing numbers of body sections. This of course greatly reduces the cost of manufacture and increases the flexibility of the unit.

The body sections are well adapted to low density heating applications and the extruded aluminum fins reduce surface density to a very low figure preventing high temperature hot spots. The units are also well adapted to high density installations such as might be required in industrial locations. The low density, low gradient, and high conductivity of the integral fin material gives a high protection factor against excessive and dangerous temperatures and fire hazards in case of accidental covering of large areas of the baseboard heater such as might happen by carpeting, draperies and the like in domestic installations.

Figure 3:
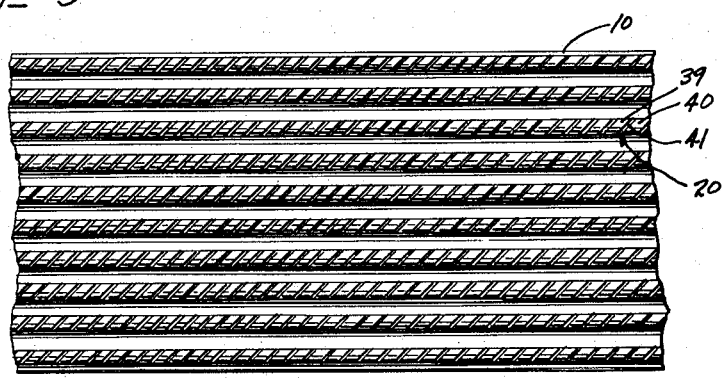
FIGURE 3 is a fragmentary front elevational view particularly showing an arrangement of diagonal air circulation slots.

Each of the extruded fins have diagonally extending slots to increase the exposure area and for the air to rise through the slots. As shown in FIGURE 3, the fins 20 have a plurality of diagonally cut slots such as 41 to provide individual protuberances such as 39 and 40 exposed on all surfaces to the air. The air will rise with good contact with the fins through the diagonal cuts and increase in temperature. This arrangement gives a greater exposure area at less cost than structures heretofore provided and can be constructed by the improved method which will be described in connection with FIGURE 7.

With the construction of FIGURES 2 and 4, when one or two straight length heating elements are used or when a hairpin shaped heating element is used, the thermal sensitive device gives top temperature protection of a positive nature. One form of electrical connection is illustrated in FIGURE 6 wherein one side of a supply line 42, which may be connected to a standard 110 volt household circuit, connects to a common lead 43 leading to one end of the heating elements 13 and 14. The other side of the supply line 42 connects through the thermal limiting units 36 and 37 to leads 44 and 45 connected to the other ends of the tubular heating elements 13 and 14. When the temperature of either of the heating elements 13 or 14 rises above a safe limit, the thermal sensitive elements 36 or 37 will open, breaking the circuit to the heating element.

As illustrated in FIGURE 4, the body section 10 is spaced from the back plate 17 which consists of a flat vertical metal plate 46 backed by an insulating sheet 47 such as foil backed asbestos. The plate 46 is turned horizontally at 48 to determine the height of the baseboard heating unit above the floor 16. The plate 46 is shaped by bending forwardly and downwardly in a humidifier chamber wall 49 to provide the humidifier chamber 18 which is provided with suitable means (not shown) for filling with water and is provided with openings such as slots 50 for the escape of vapor into the air.

The front wall 15 is provided with strengthening ribs 56 and is turned inwardly at its ends to seat in grooves 57 and 58 on the body section 10 for holding the cover plate 15 in place. Slots 55 at the base of the cover plate and slots 59 at the top of the cover plate afford passages for the upward circulation of air in front of the body section 10. The body section 10 with its attached cover plate is mounted by mounting clips 51 and 52 which seat in grooves 53 and 54 on the top and bottom of the body section 10. It will be appreciated that while a preferred form of mounting the body section is illustrated, various other arrangements may be adopted.

FIGURE 5 illustrates a body section 60 formed for an installation of less depth. The body section 60 is thinner and has a single extruded elongated opening 61 at its base for a single heating element. Extruded longitudinally extending fins project horizontally from the body section and the unit is of extruded aluminum. A tubular heating element is pressed into the opening 61 and is suitably connected to an electrical supply cable. A front cover plate 64 is mounted in front of the body section and spaced therefrom and the body section is supported on mounting clips 66 and 67 attached to a rear mounting plate 68 which may be provided at its upper end with a humidifying chamber 65.

FIGURE 7 illustrates schematically a preferred form of making the aforedescribed structure and particularly the body section. An elongated substantially continuous supply length of extruded aluminum body material is extruded from extruding equipment, not shown, moving in the direction indicated by the arrow 69. The supply length 70 is provided with integral extruded fins 71 and extruded continuous openings 72 therethrough. In accordance with the heating unit to be constructed, individual heater lengths are cut from supply length as indicated by the cutting line 73, by a suitable cutter 74. The individual lengths are then diagonally slotted to form slots 75 by a cutter 76 such as a saw blade run diagonally across the fins 71 on each side of the section. The saw blade is passed across at the desired spacings, for example ¼ inch apart simply obtaining the structure illustrated in FIGURE 3.

In use, individual body sections are formed by the method illustrated in FIGURE 7, and mounted at the heating units as shown in FIGURE 1 supported on a back plate 17 with a cover plate 15 in front. Tubular heating elements are forced into the extruded openings in the body sections and are provided with electrical connectors, preferably with a sealed box arrangement such as illustrated in FIGURE 2. The completed unit then provides a low density, low gradient high conducting unit which has been inexpensively constructed and which is effective and efficient in operation.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. An electric baseboard heating unit comprising a first extruded elongated aluminum body having a plurality of longitudinally extending fins thereon, a second extruded elongated aluminum body having a plurality of longitudinally extending fins thereon, said bodies positioned in end to end relationship with a space therebetween, a waterproof connector box in said space between said bodies, means defining elongated extruded openings through each of said bodies, first and second tubular heating elements positioned in the openings in said bodies and projecting into said connector box, and means sealing the tubular heating elements to the walls of the connector box.

2. An electric baseboard heating unit comprising an extruded elongated aluminum heat radiating body, a plurality of longitudinally extending aluminum heat radiating fins integral with said body, means defining first and second elongated extruded openings longitudinally through said body, means defining a third extruded opening extending longitudinally through said body, a U-shaped tubular heating element projecting through said first and second openings, and a thermal responsive control element in said third opening for controllingly connecting to said heating element.

References Cited in the file of this patent

UNITED STATES PATENTS

| | | |
|---|---|---|
| 1,533,226 | Colby | Apr. 14, 1925 |
| 1,796,317 | Bennett | Mar. 17, 1931 |
| 1,851,027 | Wermich | Mar. 29, 1932 |
| 1,884,097 | Modine | Oct. 25, 1932 |
| 1,892,882 | Gannon et al. | Jan. 3, 1933 |
| 2,062,466 | Marr | Dec. 1, 1936 |
| 2,190,494 | Templin | Feb. 13, 1940 |
| 2,355,621 | Brown | Aug. 15, 1944 |
| 2,405,722 | Villier | Aug. 13, 1946 |
| 2,478,161 | Melton | Nov. 8, 1949 |
| 2,579,898 | Brucker | Dec. 25, 1951 |
| 2,590,336 | Mast | Mar. 25, 1952 |
| 2,594,232 | Stockstill | Apr. 22, 1952 |
| 2,716,802 | Greer | Sept. 6, 1955 |
| 2,797,295 | Aitken-Smith et al. | June 25, 1957 |
| 2,861,167 | Wick | Nov. 18, 1958 |
| 2,899,529 | Calhoun | Aug. 11, 1959 |
| 3,010,091 | Sawyer | Nov. 21, 1961 |